United States Patent [19]
Yim

[11] Patent Number: 5,521,643
[45] Date of Patent: May 28, 1996

[54] ADAPTIVELY CODING METHOD AND APPARATUS UTILIZING VARIATION IN QUANTIZATION STEP SIZE

[75] Inventor: Myung-sik Yim, Suwon, Rep. of Korea

[73] Assignee: Samsung Electronics Co., Ltd., Kyungki-do, Rep. of Korea

[21] Appl. No.: 262,844

[22] Filed: Jun. 21, 1994

[30] Foreign Application Priority Data

Jun. 21, 1993 [KR] Rep. of Korea .................... 93-11322

[51] Int. Cl.$^6$ .................................................. H04N 7/30
[52] U.S. Cl. .................................... 348/419; 348/405
[58] Field of Search .................................. 348/419, 405

[56] References Cited

U.S. PATENT DOCUMENTS

| | | | |
|---|---|---|---|
| 4,972,260 | 11/1990 | Fujikawa et al. | 348/405 |
| 5,089,888 | 2/1992 | Zdepski et al. | 348/405 |
| 5,136,371 | 8/1992 | Savatier | 348/419 |
| 5,396,567 | 3/1995 | Jass | 348/405 |

Primary Examiner—Tommy P. Chin
Assistant Examiner—A. Au
Attorney, Agent, or Firm—Sughrue, Mion, Zinn, Macpeak & Seas

[57] ABSTRACT

An adaptive coder includes a circuit for calculating the number of intraframe and interframe blocks in one frame to be coded. When the calculated picture data is supplied to the coder, a quantization controller selects one of a number of curves for the determination of quantization step sizes, to thereby take optimal advantage of the number of blocks of each mode applied to the mode determine. In particular, a frame having a relatively large number of intraframe blocks results in selection of a curve having a large quantization step size. In contrast, a frame having a relatively large number of interframe blocks results in selection of a curve having a small quantization step size. The quantization controller determines and outputs the quantization step size, thereby taking advantage of a present buffer occupancy rate and the determined curve. Accordingly, the adaptive coder can prevent sudden changes in quantization step sizes due to the buffer occupancy rate, thereby permitting maintenance of a high picture quality during scene changes. A corresponding method is also described.

14 Claims, 2 Drawing Sheets

ADAPTIVELY CODING METHOD AND APPARATUS UTILIZING VARIATION IN QUANTIZATION STEP SIZE

BACKGROUND OF THE INVENTION

1. Field of the Invention

The present invention relates to the determination of a quantization step size in a system which digitally codes picture information for transmission and storage of data. More particularly, the present invention relates to a coding method which adaptively varies a quantization step size so as to quantize a picture signal during intraframe coding or interframe coding, thereby stably maintaining the variation of data quantity stored in a transmission buffer, even when a scene change occurs. An apparatus employing an adaptively set quantization step is also disclosed.

2. Discussion of Related Art

In digital-transmitting or digital-processing a video signal, various coding methods have been used for the sake of reduction in transmission costs. Variable bit rate coding is a typical method for high efficiency coding. In variable bit rate coding, pulse code modulation is performed for a large amount of data during intraframe coding, while differential pulse code modulation is executed to produce the minimum amount of data during interframe coding. Video data, which has been pulse code modulated or differential pulse code modulated, is supplied to a transmission buffer via a quantizer or variable length coder, etc.

While the data quantity supplied to the transmission buffer is not constant, a transmission channel of digital data generally has a constant transmission rate. Accordingly, a coded signal is transmitted to the receiver at a constant transmission rate after first being stored in the transmission buffer. However, since the buffer does not have an infinite storage capacity for data, a quantization step size should be varied in accordance with the occupancy rate, by continuously checking the occupancy rate of data provided to the transmission buffer. This variation of a quantization step size prevents an overflow or underflow of the buffer.

A conventional coding method employs intraframe coding when a scene change occurs. The quantization step size is radically enlarged because the data occupancy rate in the buffer is raised due to an increase in the quantity of data. When a scene changes, a low occupancy in the buffer makes the quantization step size small, while a high occupancy in the buffer makes the quantization step size larger than that prior to changing the scene. Therefore, during a scene change there is a drawback that there is a remarkable difference in picture quality within one frame. Since the frames next to a scene changed frame, retain the previous high quantization step size due to the earlier high occupancy rate in the buffer, it takes a long time to improve picture quality.

European Patent Publication No. 0,444,839 A2 published on Sep. 4, 1991, discloses a system for resetting a quantization step size during a scene change. This reference discloses a technology which selectively intraframe codes and interframe codes a picture signal. In an exemplary case, a macro block of coded picture data is intraframe coded by a refresh, employing the quantization step size of the previous frame. On the other hand, when intraframe coding without a refresh is performed, it uses the largest quantization step size previously determined, thereby quantizing picture data and supplying the quantized data to a transmission buffer memory. Accordingly, the coding system disclosed by this reference prevents storage of an excessively large amount of quantized data in the buffer, thereby maintaining smooth picture transitions.

SUMMARY OF THE INVENTION

It is an object of the present invention to provide a coding method which adaptively determines quantization step sizes according to both the number of blocks subjected to intraframe coding or interframe coding and the data occupancy rate of a buffer within one frame when a scene change occurs, thereby maintaining good picture quality over the scene change and a variation state of data stored in the buffer.

Another object of the present invention is to provide a coding apparatus to realize the coding method.

These and other objects, features and advantages according to the present invention are provided by an adaptive coding method which selectively intraframe codes or interframe codes a picture, quantizes the coded data, and transmits the quantized data via a buffer at a constant transmission rate. The method includes steps for:

(a) previously setting up a plurality of curves for the determination of quantization step sizes (b) pre-processing to calculate the number of interframe or intraframe blocks for one frame; (c) selecting one of the curves for determining quantization step sizes for the frame on the basis of the number of the interframe and intraframe blocks calculated at the (b) step; (d) determining quantization step sizes according to the selected curve for the selected quantization step size and the fullness of data storage in the buffer; and (e) quantizing the intraframe coded and interframe coded data, thereby taking advantage of the quantization step size.

These and other objects, features and advantages according to the present invention are provided by an adaptive coding apparatus which selectively intra-codes or inter-codes a picture signal, quantizes the coded data, and transmits the quantized data at a constant transmission rate. The apparatus includes:

a mode determiner for previously calculating the number of interframe or intraframe blocks representing one frame; a buffer for outputting input data at a constant transmission rate and generating a present buffer occupancy rate data; a quantization controller for storing a plurality of predetermined quantization step sizes, and determining and outputting a quantization step size, based on both the information of the number of blocks supplied from the mode determiner and the buffer occupancy rate data from the buffer; and a quantizer for quantizing and generating video data according to the quantization step size supplied from the quantization controller.

BRIEF DESCRIPTION OF THE DRAWINGS

The preferred embodiments are described with reference to the drawings in which.

DETAILED DESCRIPTION OF THE PREFERRED EMBODIMENT

A preferred embodiment of the present invention will now be described below in more detail with reference to the accompanying drawings.

Figure 1:
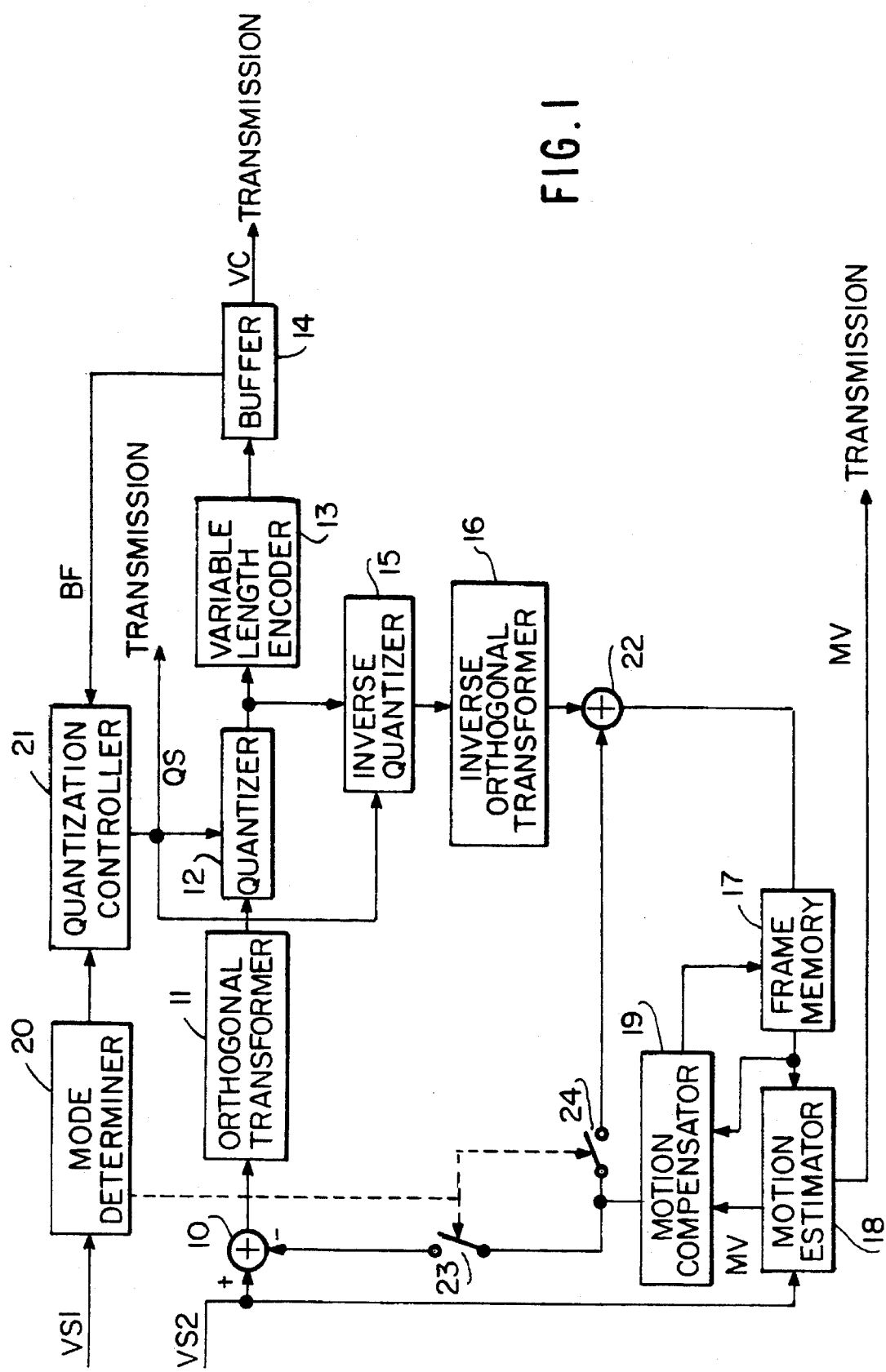
FIG. 1 shows a block diagram illustrating an adaptive coding apparatus using variation of a quantization step size in accordance with the present invention.

FIG. 1 illustrates an adaptive coding apparatus using variation quantization step sizes in accordance with an embodiment of the present invention. In FIG. 1, a subtractor 10, mode determiner 20 and motion estimator 18 receive picture data which is divided into blocks of N×N pixels by a picture divider (not shown). Present picture data VS2 is supplied to the subtractor 10 and motion estimator 18, and simultaneously the following picture data VS1 is provided to the mode determiner 20. An output signal of the subtractor 10 is supplied to a quantizer 12 via an orthogonal transformer 11.

Figure 2:
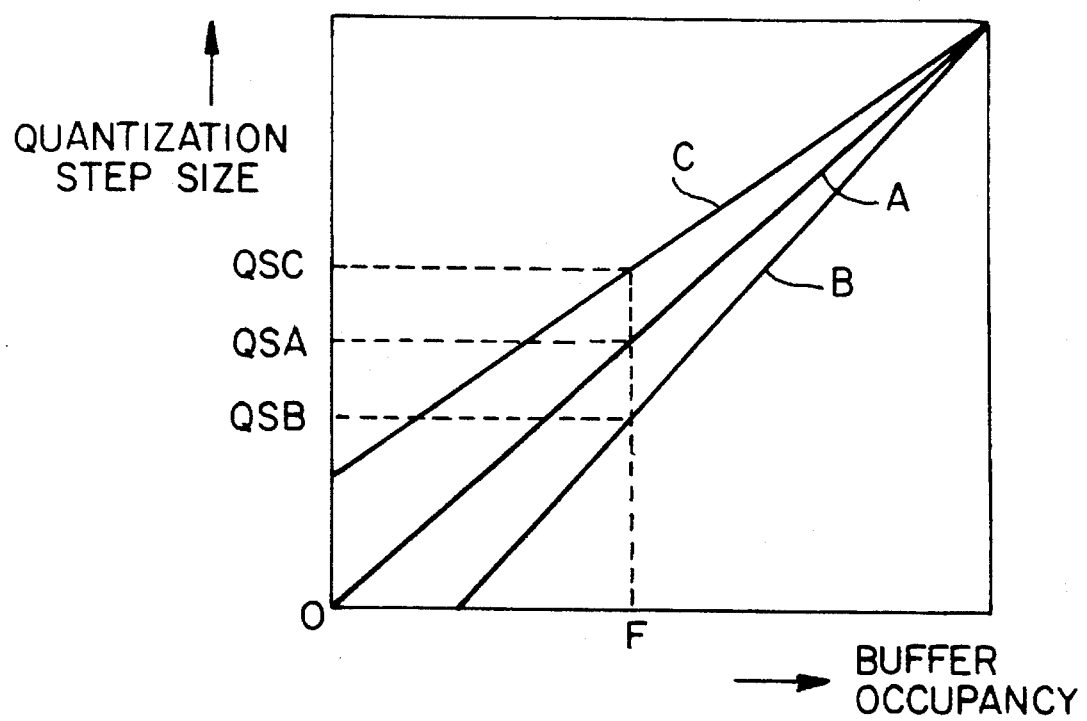
FIG. 2 shows curves for determining a quantization step size used in the apparatus of FIG. 1.

The mode determiner 20 calculates the number of blocks for intraframe or interframe coding, using the input picture data VS1 of one picture, which is to be used with the curves of FIG. 2. A quantization controller 21 receives a buffer occupancy rate signal BF output from a buffer 14 and an output signal of the mode determiner 20, and determines a quantization step size QS. Here, the buffer occupancy rate signal BF represents the level or quantity of data stored in the buffer 14.

A quantization step size QS is supplied to the quantizer 12 and inverse quantizer 15, respectively. The quantization step size QS is also transmitted to a decoder (not shown) for decoding picture data VS2 after it has been coded.

The quantized data output from the quantizer 12 is transmitted to the buffer 14 after variable length coding by variable length encoder 13. The quantized data is also provided to an inverse orthogonal transformer 16, after being inverse-quantized by the inverse quantizer 15. An adder 22 adds an output signal routed through a first switch 23 and an output signal of the inverse orthogonal transformer 16, and then outputs an added value to a frame memory 17.

A motion estimator 18 performs motion estimation, using picture data VS2 input from the exterior and an output signal of the frame memory 17. Motion vector MV generated by the motion estimator 18 is preferably supplied to a motion compensator 19 and to a decoder (not shown). The motion compensator 19 performs motion compensation for moving parts of the pictures, to thereby take advantage of the motion vector MV and an output signal of the frame memory 17. An output signal provided by the motion compensator 19 is supplied to first and second switches 23 and 24. It will be appreciated that the first and second switches 23 and 24 are turned on/off, i.e., opened or closed, under the control of the mode determiner 20.

Picture data, which is divided into blocks of size N×N pixels (which is generally represented as blocks of $N_1 \times N_2$ pixels, and for convenience of explanation, is assumed to have $N_1 = N_2 = N$) is supplied to the subtractor 10, mode determiner 20 and motion estimator 18 from the exterior. Advantageously, the picture data VS1 is supplied to the mode determiner 20, and simultaneously the present picture data VS2, which is earlier than the picture data VS1, is supplied to the subtractor 10 and motion estimator 18.

When receiving the picture data VS1, the mode determiner 20 determines coding modes with respect to each of the blocks within one picture. That is, the mode determiner 20 determines as "interframe blocks" blocks of the present picture having many similar scenes between two pictures adjacent to each other, while it determines as "intraframe blocks" blocks of the present picture having a lot of scene changes, and then stores coding mode information of blocks in each picture.

When the present picture data is supplied to the apparatus of FIG. 1, the mode determiner 20 determines coding methods for the present picture, taking advantage of mode information that is established from pre-processing of the present picture data VS2. The mode determiner 20 maintains the switches 23 and 24 open, in an exemplary case wherein a plurality of intraframe blocks are included within the present picture, while it keeps the switches 23 and 24 closed, in the case of including a plurality of interframe blocks within the present picture. The mode determiner 20 outputs information as to the number of intraframe blocks and interframe blocks to the quantization controller 21.

When the switches 23 and 24, which are under the control of and operated with respect to each block, are both closed, the subtractor 10 outputs the difference between the present picture data VS2 input from the exterior and the previous picture data output from the motion compensator 19, to the orthogonal transformer 11. The adder 22 adds data output from the inverse orthogonal transformer 16 and data output from the motion compensator 19, and outputs a resultant value to the frame memory 17. On the other hand, when the switches 23 and 24 are both open the subtracter 10 outputs the present picture data VS2 input from the exterior to the orthogonal transformer 11.

The adder 22 adds output data of the inverse orthogonal transformer 16 and that of the motion compensator 19, and outputs the resultant value to the frame memory 17. The output data of the subtractor 10 is supplied to the orthogonal transformer 11 and transformed into transformation coefficient data in the frequency domain. The quantizer 12 quantizes the transformation coefficient data, taking advantage of a quantization weight matrix, which is determined according to the quantization step size QS from the quantization controller 21.

The quantization controller 21 determines curves for defining quantization step sizes, using the information regarding the number of blocks for each mode which is obtained from the mode determiner 20. The quantization controller 21 determines a quantization step size for each block, based on the buffer occupancy rate signal BF which is generated from the buffer 14 for each block. However, it will be appreciated that, as an alternative embodiment, the buffer occupancy rate signal BF can be generated on a per slice basis, where each slice unit includes a plurality of blocks. The quantization step size QS generated from the quantization controller 21 is transmitted to the quantizer 12, inverse quantizer 15 and the associated receiver (not shown). The quantizer 12 quantizes the transformation coefficient data supplied according to the quantization step size QS, and outputs the quantized data to the variable length coder 13 and inverse quantizer 15. The variable length coder 13 variable length codes the quantized coefficients output from the quantizer 12, taking their statistical characteristics into consideration, by, for example, zigzag scanning, run amplitude coding, or Huffman coding methods.

The buffer 14 outputs compressed data VC generated from the variable length coder 13 via a transmission channel to the receiver at a constant transmission rate. The buffer 14 simultaneously provides the buffer occupancy rate signal BF, which is used for generation of quantization step sizes, to the quantization controller 21.

The inverse quantizer 15 inversely quantizes the quan- tized data according to the quantization step size QS supplied from the quantization controller 21, and outputs the inverse-quantized data to the inverse orthogonal transformer 16. Preferably, transformer 16 transforms the data in the frequency domain into picture data in the two-dimensional spatial domain and outputs the transformed data to the adder 22. Output data from the adder 22 is stored in the frame memory 17 and is used for the motion estimation and motion compensation by the motion estimator 18 and motion compensator 19. The motion estimator 18 calculates a motion vector MV, using the present picture data VS2 input from the exterior and the data input from the frame memory 17. The motion compensator 19 processes the previous picture data stored in the frame memory 17 into original data using the motion vector MV, which is also supplied to the receiver. The reproduced previous picture data is stored in the frame memory 17.

Since the motion estimation and compensation mentioned above is a well-known technique, the detail description will not be provided. Hereinafter, the determination of a quantization step size in accordance with the present invention will be described in detail with reference to the accompanying FIG. 2.

FIG. 2 shows curves for determining a quantization step size, which have different slopes based on the change of a buffer occupancy rate.

Within one frame, the number of interframe blocks is expressed by "M_INTER", the number of intraframe blocks is denoted by "M_INTRA", and total number of blocks for one picture is shown as "M_TOTAL". The number of a first reference block ($\alpha \times$M_TOTAL) and that of a second reference block ($\beta \times$ M_TOTAL) are fixed in order to select curves for determining quantization step sizes, wherein $\alpha$ and $\beta$ are constants between 0 and 1 (that is, $0<\alpha<\beta<1$).

The quantization controller 21 compares the number of the interframe blocks (M_INTER) with the number of the first reference block ($\alpha \times$M_TOTAL) and second reference block ($\beta \times$M_TOTAL). In an exemplary case where the number of the interframe blocks (M_INTER) is between the number of the first and second reference blocks, that is, "$\alpha \times$M_TOTAL<M_INTER<$\beta \times$M_TOTAL", the quantization controller 21 selects a curve 'A' for the determination of a quantization step size. When the number of the interframe block (M_INTER) is larger than that of the second reference block ($\beta \times$M_TOTAL), the controller 21 selects a curve 'B' indicating a low buffer occupancy rate. When the number of the interframe blocks (M_INTER) is less than that of the first reference block ($\alpha \times$M_TOTAL), the controller 21 selects curve 'C' due to high buffer occupancy rate thereafter. A procedure whereby the quantization control 21 chooses curve 'C' in the determination of a quantization step size for the next picture will be described. The quantization controller 21 determines and outputs the quantization step size QSA as determined by the buffer occupancy rate signal BF supplied from the buffer 14. In the scene change of the following frames, the number of the intraframe blocks for the following picture is more than that of the interframe blocks. Therefore, since the number of the interframe blocks (M_INTER) is less than that of the first reference blocks ($\alpha \times$M_TOTAL), the quantization controller 21 selects curve 'C' for the determination of a quantization step size. As a result, if the buffer occupancy rate signal BF corresponding to a final block of the present picture is "F", the quantization step size of an initial block for the following picture is increased to "QSC". The change of curves determines the applicable quantization step size which can be used to suitably adjust data quantities to be quantized, thereby preventing the fullness of the buffer 14.

The above described embodiment compares the number of interframe blocks with predetermined reference values to thereby select one of curves to be used determining quantization step size. However, it is recognized that other embodiments can be made by comparing the number of intraframe blocks with predetermined reference values.

As described above, the adaptive coder in accordance with the present invention previously calculates the number of intraframe and interframe blocks for one picture which is to be coded. When the calculated picture data is supplied to the coder, the quantization controller selects one of the curves for the determination of a quantization step size, using the number of blocks for each mode output from the mode determiner. In particular, a frame having a relatively large number of intraframe blocks corresponds to a curve representing a large quantization step size, while a frame having large number of interframe blocks results in a selection having a small curve quantization step size. The quantization controller determines and outputs the quantization step size, thereby taking advantage of the present buffer occupancy rate and the selected curve. Accordingly, the apparatus of the present invention can prevent the sudden changes of quantization step size due to variations in the buffer occupancy rate, thereby permitting the maintenance of high picture quality during scene changes.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An adaptive coding method in a system which selectively intraframe and interframe codes a picture signal into coded data, quantizes the coded data, and transmits the quantized coded data via a buffer at a constant transmission rate, the method comprising the steps of:

(a) previously setting up a plurality of curves for determination of quantization step sizes;

(b) calculating respective numbers of interframe or intraframe blocks for one frame;

(c) selecting one of said curves for determining quantization step sizes for said frame on the basis of the respective numbers of said interframe and intraframe blocks calculated during said step (b);

(d) determining a quantization step size according to the selected one of said curves and respective fullness of data storage in the buffer; and (e) quantizing respective intraframe coded and interframe coded data, thereby taking advantage of the determined quantization step size.

2. The adaptive coding method claimed in claim 1, wherein said curves are characterized in that a change in level of said quantization step sizes corresponding to variations of buffer occupancy rate is different for each of said curves, and wherein said step (a) comprises a step (f) of previously selecting different curves for determination of quantization step sizes with respect to said buffer occupancy rate.

3. The adaptive coding method claimed in claim 2, wherein said step (f) for selecting curves comprises the steps of:

(g) selecting a first curve for determination of said quantization step size, having an intermediate magnitude with respect to a relationship between a change in level of said quantization step size and said buffer occupancy rate, in the case that the number of the interframe blocks is between first and second reference values;

(h) selecting a second curve for determination of said quantization step size, having a relatively low magnitude with respect to a relationship between a change in level of said quantization step size and said buffer occupancy rate, in the case that the number of the interframe blocks is greater than the second reference value; and (i) selecting a third curve for determination of said quantization step size, having a relatively high magnitude with respect to a relationship between a change in level of said quantization step size and said buffer occupancy rate, in the case that the number of the interframe blocks is less than the first reference value.

4. An adaptive coding apparatus which selectively intraframe and interframe codes a picture signal to produce coded data, quantizes the coded data, and transmits the quantized coded data at a constant transmission rate, the apparatus comprising:

a mode determiner for previously calculating respective numbers of interframe or intraframe blocks for one frame;

a buffer for outputting received quantized coded data at a constant transmission rate and generating present buffer occupancy rate data;

a quantization controller for storing a plurality of predetermined quantization step sizes, and for determining and outputting a quantization step size, based on both the information regarding respective numbers of said interframe and said intraframe blocks supplied from said mode determiner and the buffer occupancy rate data from said buffer; and a quantizer for quantizing and generating picture data according to the determined quantization step size supplied from said quantization controller.

5. The adaptive coding apparatus claimed in claim 4, wherein said mode determiner receives a first picture to be coded before coding and compares on a block-by-block basis said first picture with a second picture, which is earlier in time than the former, thereby calculating the respective numbers of interframe and intraframe blocks for one picture.

6. The adaptive coding apparatus claimed in claim 5, wherein said quantization controller stores a plurality of curves for determination of said quantization step size, selects one of said curves for use in determination of said quantization step size according to the number of interframe blocks supplied from said mode determiner, chooses one of said quantization step sizes from the selected one of said curves for determination responsive to the buffer occupancy rate data, and outputs the selected quantization step size to said quantizer.

7. The adaptive coding apparatus claimed in claim 6, wherein said quantization controller:

selects a first curve for determination of said quantization step size, having an intermediate magnitude with respect to a relationship between a change in level of said quantization step size and a buffer occupancy rate, in the case that the number of the interframe blocks is between first and second reference values;

selects a second curve for determination of said quantization step size, having a relatively low magnitude with respect to a relationship between a change in level of said quantization step size and said buffer occupancy rate, in the case that the number of the interframe blocks is greater than said second reference value; and selects a third curve for determination of said quantization step size, having a relatively high magnitude with respect to a relationship between a change in level of said quantization step size and said buffer occupancy rate, in the case that the number of the interframe blocks is less than the first reference value.

8. An adaptive coding method for a system which selectively intraframe and interframe codes a picture signal to provide respective intraframe and interframe coded data under control of a controller storing a plurality of curves permitting determination of quantization step sizes, quantizes the coded data to produce quantized data, and transmits the quantized data via a buffer device, generating a control signal indicative of fullness of the buffer device, at a constant transmission rate, said method comprising the steps of:

(a) calculating respective numbers of interframe and intraframe coded blocks for one frame;

(b) selecting one of the curves used in determining quantization step sizes for said frame on the basis of the respective numbers of said interframe and intraframe coded blocks calculated during said step (a);

(c) determining quantization step sizes according to the selected one of said curves and said control signal provided by the buffer;

(d) quantizing the intraframe coded and interframe coded data using said quantization step sizes.

9. The adaptive coding method claimed in claim 1, wherein said curves are characterized in that each of said quantization step sizes is from different all others for each value of said control signal, and wherein said method further comprises the step of (e) providing said curves for determination of said quantization step sizes with respect to said control signal before performing said step (a).

10. The adaptive coding method claimed in claim 2, wherein said step (e) comprises the steps of:

(f) providing a first curve producing an intermediate magnitude quantization step size change in response to said control signal, wherein said first curve is selected when said number of said interframe blocks is between first and second reference values;

(g) providing a second curve having a relatively large quantization step size change in response to said control signal, wherein said second curve is selected when said number of said interframe blocks is greater than said second reference value; and (h) providing a third curve having a relatively small quantization step size change in response to said control signal, wherein said third curve is selected when said number of the interframe blocks is less than said first reference value.

11. An adaptive coding apparatus which selectively intraframe and interframe codes a picture signal, quantizes the coded data using a quantizer generating picture data according to a quantization step size control signal, and transmits quantized data via a buffer providing quantized data at a constant transmission rate and generating present buffer occupancy rate data, said apparatus comprising:

mode determining means for calculating respective numbers of interframe and intraframe blocks in one frame; and quantization controller means, storing a plurality of predetermined quantization step size curves, for determining and for outputting a quantization step size control signal, based on at least one of said respective numbers and said buffer occupancy rate data.

12. The adaptive coding apparatus claimed in claim 11, wherein said mode determining means comprises:

first means for receiving a first picture and a second picture separated in time from one another; and second means for comparing said first picture with said second picture on a block by block basis, to thereby calculate said respective numbers of said interframe and said intraframe blocks representing one of said first and said second pictures.

13. The adaptive coding apparatus claimed in claim 11, wherein said quantization controller comprises:

first means for storing said curves used in determination of said quantization step sizes;

second means for selecting one of said curves for determination of said quantization step sizes according to at least one of said numbers supplied by said mode determining means;

third means for choosing a respective one of a plurality of quantization step sizes defined by the selected curve in response to said buffer occupancy rate data; and fourth means for generating said quantization step size control signal corresponding to the selected quantization step size.

14. The adaptive coding apparatus claimed in claim 13, wherein said second means in said quantization controller selects a first curve having an intermediate quantization step size change with respect to an input buffer occupancy rate data, when the number of said interframe blocks is between first and second reference values, selects a second curve having a relatively high quantization step size change indicative of a low optional buffer occupancy rate, when said number of the interframe blocks is greater than said second reference value, and selects a third curve having a relatively low quantization step size change indicative a correspondingly high buffer occupancy rate when said number of said interframe blocks is less than the first reference value.

* * * * *